United States Patent
Dürr

(10) Patent No.: US 12,025,978 B2
(45) Date of Patent: Jul. 2, 2024

(54) REMOTE CONTROL AND METHOD FOR MODIFYING AN UNMANNED AERIAL VEHICLE'S AUTONOMOUS FLIGHT OF A PREDETERMINED TRAJECTORY, AND SYSTEM COMPRISING A REMOTE CONTROL AND AN UNMANNED AERIAL VEHICLE

(71) Applicant: Sony Group Corporation, Tokyo (JP)

(72) Inventor: Peter Dürr, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 145 days.

(21) Appl. No.: 17/627,128

(22) PCT Filed: Feb. 14, 2020

(86) PCT No.: PCT/EP2020/053897
§ 371 (c)(1),
(2) Date: Jan. 14, 2022

(87) PCT Pub. No.: WO2021/013386
PCT Pub. Date: Jan. 28, 2021

(65) Prior Publication Data
US 2022/0269261 A1 Aug. 25, 2022

(30) Foreign Application Priority Data
Jul. 24, 2019 (EP) ..................... 19188094

(51) Int. Cl.
*G05D 1/00* (2006.01)
*B64C 39/02* (2023.01)
(52) U.S. Cl.
CPC ......... *G05D 1/0016* (2013.01); *B64C 39/024* (2013.01); *G05D 1/0044* (2013.01);
(Continued)

(58) Field of Classification Search
CPC .... G05D 1/0016; G05D 1/0044; G05D 1/101; B64C 39/024; B64U 2201/10; B64U 2201/20
(Continued)

(56) References Cited

U.S. PATENT DOCUMENTS

| | | | |
|---|---|---|---|
| 2009/0171516 A1 | 7/2009 | Reich | |
| 2016/0091894 A1* | 3/2016 | Zhang | G05D 1/0044 701/2 |

(Continued)

FOREIGN PATENT DOCUMENTS

| | | | |
|---|---|---|---|
| JP | 2017509919 A | 4/2017 | |
| JP | 2019051755 A | 4/2019 | |

(Continued)

OTHER PUBLICATIONS

International Search Report and Written Opinion mailed on Apr. 29, 2020, received for PCT Application PCT/EP2020/053897, Filed on Feb. 14, 2020, 8 pages.

(Continued)

*Primary Examiner* — Muhammad Shafi
(74) *Attorney, Agent, or Firm* — XSENSUS LLP

(57) ABSTRACT

A remote control adapted to modify an Unmanned Aerial Vehicle (UAV)'s autonomous flight of a predetermined trajectory is provided. The remote control includes at least one moveable control member for adjusting a set point of an adjustable control parameter of the UAV. Further, the remote control includes at least one actuator capable of controllably applying a torque to the at least one control member. The remote control additionally includes a processing circuit configured to determine a set point of torque to be applied to the at least one control member based on a reference set point of the control parameter. The reference set point of the control parameter is related to the predetermined trajectory.

(Continued)

The processing circuit is further configured to control the at least one actuator to apply the determined set point of torque to the at least one control member.

19 Claims, 2 Drawing Sheets

(52) U.S. Cl.
CPC ......... *G05D 1/101* (2013.01); *B64U 2201/10* (2023.01); *B64U 2201/20* (2023.01)

(58) Field of Classification Search
USPC .......................................................... 701/2
See application file for complete search history.

(56) References Cited

U.S. PATENT DOCUMENTS

| | | | |
|---|---|---|---|
| 2016/0171896 A1* | 6/2016 | Buchmueller | G08G 5/0008 701/3 |
| 2016/0282943 A1 | 9/2016 | Laurendeau | |
| 2017/0259917 A1 | 9/2017 | Winn et al. | |
| 2018/0096455 A1* | 4/2018 | Taylor | G06T 17/05 |
| 2018/0362158 A1 | 12/2018 | Zhang et al. | |
| 2019/0003840 A1* | 1/2019 | Song | G06F 16/5866 |
| 2019/0033892 A1 | 1/2019 | Gomez Gutierrez et al. | |
| 2019/0077504 A1 | 3/2019 | Chapman | |
| 2019/0079541 A1 | 3/2019 | Tao et al. | |
| 2019/0144101 A1* | 5/2019 | van der Linden | B64C 13/503 244/213 |

FOREIGN PATENT DOCUMENTS

| | | |
|---|---|---|
| WO | 2016/050099 A1 | 4/2016 |
| WO | 2019/041874 A1 | 3/2019 |

OTHER PUBLICATIONS

Mellinger et al., "Minimum Snap Trajectory Generation and Control for Quadrotors", 2011, 6 pages.

Nieuwstadt et al., "Differential flatness and absolute equivalence of Nonlinear Control Systems", SIAM Journal on Control and Optimization, vol. 36, No. 4, Jul. 1998, pp. 1225-1239.

* cited by examiner

REMOTE CONTROL AND METHOD FOR MODIFYING AN UNMANNED AERIAL VEHICLE'S AUTONOMOUS FLIGHT OF A PREDETERMINED TRAJECTORY, AND SYSTEM COMPRISING A REMOTE CONTROL AND AN UNMANNED AERIAL VEHICLE

CROSS-REFERENCE TO RELATED APPLICATIONS

The present application is based on PCT filing PCT/EP2020/053897, filed Feb. 14, 2020, which claims priority to EP 19188094.7, filed Jul. 24, 2019, the entire contents of each are incorporated herein by reference.

FIELD

The present disclosure relates to active control of an Unmanned Aerial Vehicle (UAV). In particular, examples relate to a remote control and a method for modifying an UAV's autonomous flight of a predetermined trajectory. Further examples relate to a system comprising a remote control and an UAV.

BACKGROUND

In applications such as photography, video production or entertainment shows, it is often desirable to be able to precisely control the trajectory of a robotic device such as a drone equipped with a camera or light source. Typically, such robotic devices are controlled using an RC transmitter (RC control or wireless control) that allows a user to command a change of the acceleration, velocity, position, angular acceleration, angular velocity and/or orientation of the robotic device. In the case of a quadrotor drone, for example, the RC transmitter is often used to control the set point for the combined thrust of all four propellers as well as the set points for the torques around the three axes of the device (i.e. roll, pitch and yaw). This allows an expert human pilot to control the trajectory of the quadcopter by mentally computing the set points required to achieve a desired motion of the quadcopter, and commanding the corresponding values via the control sticks of the RC transmitter. Expert human drone pilots, however, are not only expensive, but they are also susceptible to fatigue and they cannot replicate flown trajectories accurately for multiple repetitions.

An alternative way to program drone trajectories is to use a Graphical User Interface (GUI) on a computer or mobile device (e.g. a smartphone). This approach generates a fixed control program that the drone will automatically follow, and that can be replicated precisely as many times as necessary. It is very difficult, however, to fine-tune trajectories generated in this manner, or to alter them quickly according to external influences.

Hence, there may be a demand for improved control of UAVs.

SUMMARY

This demand is met by apparatuses and methods in accordance with the independent claims. Advantageous embodiments are addressed by the dependent claims.

According to a first aspect, the present disclosure provides a remote control adapted to modify an UAV's autonomous flight of a predetermined trajectory. The remote control comprises at least one moveable control member for adjusting a set point of an adjustable control parameter of the UAV. Further, the remote control comprises at least one actuator capable of controllably applying a torque to the at least one control member. The remote control additionally comprises a processing circuit configured to determine a set point of torque to be applied to the at least one control member based on a reference set point of the control parameter. The reference set point of the control parameter is related to the predetermined trajectory. The processing circuit is further configured to control the at least one actuator to apply the determined set point of torque to the at least one control member. The remote control comprises a sensing circuit configured to sense the position of the at least one control member while the determined set point of torque is applied to the at least one control member by the at least one actuator in order to detect a user input for modifying the predetermined trajectory. In addition, the remote control comprises a wireless transmitter configured to transmit information about the sensed position of the at least one control member to the UAV.

According to a second aspect, the present disclosure provides a system comprising an UAV configured to autonomously fly a predetermined trajectory, and a remote control as described herein. The UAV comprises a wireless receiver configured to receive the information about the sensed position of the at least one control member. Further, the UAV comprises a processing circuit configured to determine an updated set point of the control parameter based on the information about the sensed position of the at least one control member. The processing circuit of the UAV is further configured to use the updated set point of the control parameter for controlling operation of the UAV in order to modify the UAV's autonomous flight of the predetermined trajectory.

According to a third aspect, the present disclosure provides a method for modifying an UAV's autonomous flight of a predetermined trajectory. The method comprises determining a set point of torque to be applied to at least one control member of a remote control for the UAV based on a reference set point for an adjustable control parameter of the UAV. The reference set point of the control parameter is related to the predetermined trajectory, and wherein a set point of the control parameter is adjustable via the at least one moveable control member. Further, the method comprises controlling at least one actuator of the remote control to apply the determined set point of torque to the at least one control member. The method additionally comprises sensing the position of the at least one control member while the determined set point of torque is applied to the at least one control member by the at least one actuator in order to detect a user input for modifying the predetermined trajectory. The method comprises transmitting information about the sensed position of the at least one control member to the UAV.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
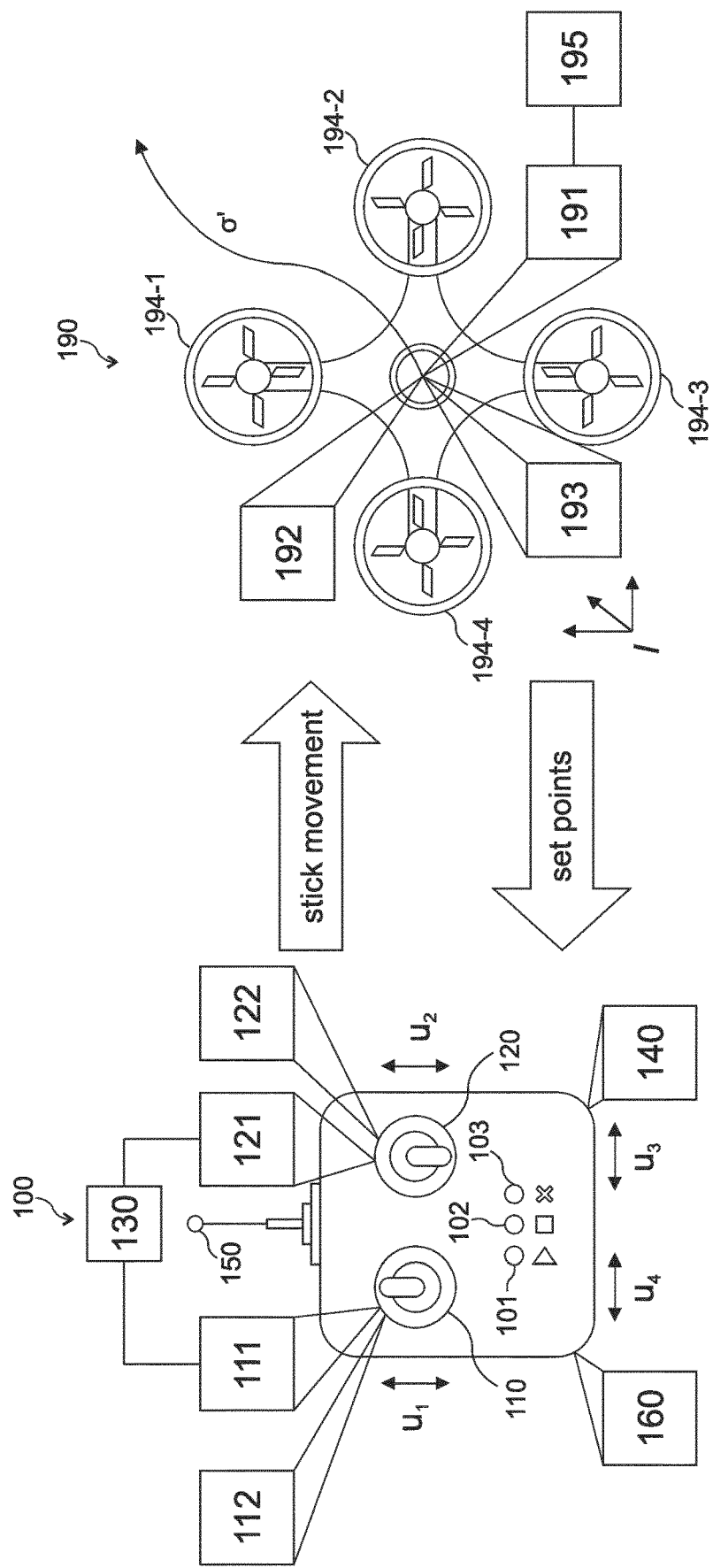
FIG. 1 illustrates an example of a system comprising an UAV and a remote control.

FIG. 1 illustrates a remote control 100 and an UAV 190. In FIG. 1, the UAV 190 is depicted as a quadcopter, i.e. multirotor drone comprising four rotors 194-1, . . . , 194-4. However, it is to be noted that the UAV 190 is not limited thereto. In general, the UAV 190 may be any type of UAV such as, e.g., a mono-copter, a bi-copter or a fixed-wing UAV (e.g. a plane or a Vertical Take-Off and Landing, VTOL, aircraft).

The UAV 190 is configured to autonomously fly a predetermined trajectory σ'(t). For example, the data related to the predetermined trajectory σ' may be stored in a (e.g. non-volatile) memory 195 of the unmanned aerial vehicle 190. A processing circuit 191 of the UAV 190 may read the predetermined trajectory σ' from the memory 195 and control the rotors 194-1, . . . , 194-4 or a separate control unit for the rotors 194-1, . . . , 194-4 such that the rotors 194-1, . . . , 194-4 adjust their respective rotor speeds based on the predetermined trajectory σ'. Accordingly, the UAV 190 may autonomously fly the predetermined trajectory σ'. For example, the processing circuit 191 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuit 191 may optionally be coupled to, e.g., read only memory (ROM) for storing software, random access memory (RAM) and/or non-volatile memory.

The remote control 100 is adapted to modify the UAV's autonomous flight of the predetermined trajectory σ'. In the example illustrated in FIG. 1, the remote control 100 comprises two control members 110 and 120 (e.g. control sticks) each moveable along two spatial axes (e.g. horizontal axis and vertical axis as illustrated in FIG. 1). Each of the two control members 110 and 120 is for adjusting set points of two different adjustable control parameters of the UAV 190. For example, the control member 110 allows to adjust the set points of adjustable control parameters $u_1$ and $u_4$ of the UAV 190, whereas the control member 120 allows to adjust the set points of adjustable control parameters $u_2$ and $u_3$ of the UAV 190. By changing the position of the control member 110 along the vertical axis, the set point of the adjustable control parameter $u_1$ of the UAV 190 may be adjusted by a user. Similarly, by changing the position of the control member 110 along the horizontal axis, the set point of the adjustable control parameter $u_4$ of the UAV 190 may be adjusted by a user. Analogously, the adjustable control parameters $u_2$ and $u_3$ of the UAV 190 may be adjusted by a user via the control member 120.

Although FIG. 1 illustrates a remote control 100 comprising two control members 110 and 120, a remote control according to proposed technique may comprise any number of control members for adjusting set-points of adjustable control parameters of the UAV 190. For example, the remote control may comprise more or less than the two control members 110 and 120 illustrated in FIG. 1. The number of control members may, e.g., depend on the type of the UAV 100. In other words, a remote control according to the proposed technique comprises at least one moveable control member for adjusting a set point of an adjustable control parameter of the UAV.

The four adjustable control parameters $u_1$ to $u_4$ of the UAV 190 allow to control the motion of the UAV 190. For example, the adjustable control parameter $u_1$ may describe (denote) the total torque created by all four rotors 194-1, . . . , 194-4 of the UAV 190. The adjustable control parameters $u_2$, $u_3$ and $u_4$ may describe the torques created by the rotors 194-1, . . . , 194-4 of the UAV 190 around the pitch axis, the roll axis and the yaw axis of the UAV 190. The pitch axis, the roll axis and the yaw axis are indicated by the coordinate system I in FIG. 1. It is to be noted that the above example of the four control parameters $u_1$ to $u_4$ of the UAV 190 is for illustrative purposes only and that according to the proposed technique more, less or other control parameters may be used (e.g. depending on the type of the UAV).

The remote control 100 further comprises at least one actuator capable of controllably applying a torque to the at least one control member of the remote control 100. For example, the remote control 100 comprises actuators 111 and 121 for the control members 110 and 120 such that torques for each of the two spatial axes along which the control members 110 and 120 are moveable may be applied to the control members 110 and 120. Depending on the number of control members and the number of spatial axes along which the control members are moveable, the number of actuators may vary.

The remote control 100 additionally comprises a processing circuit 130 configured to determine a set point of torque to be applied to the at least one control member based on a reference set point of the associated control parameter. The reference set point of the control parameter is related to the predetermined trajectory σ'. For example, the set point of torque to be applied to the control member 110 along the vertical axis is based on a reference set point u'$_1$ of the associated control parameter u$_1$. Similarly, set point of torque for the horizontal axis of the control member 110 and the set points of torque for the spatial axes of the control member 120 are based on the reference set points u'$_2$, u'$_3$; and u'$_4$ of the associated control parameters u$_2$, u$_3$ and u$_4$. The reference set points u'$_1$ to u'$_4$ are related to the predetermined trajectory σ'. For example, the processing circuit 130 may be a single dedicated processor, a single shared processor, or a plurality of individual processors, some of which or all of which may be shared, a DSP hardware, an ASIC or a FPGA. The processing circuit 130 may optionally be coupled to, e.g., ROM for storing software, RAM and/or non-volatile memory.

The processing circuit 130 is further configured to control the at least one actuator to apply the determined set point of torque to the at least one control member of the remote control 100. For example, the processing circuit 130 may control the actuator 111 for the control member 110 to apply the set point of torque determined for the reference set point u'$_1$ of the associated control parameter u$_1$ to the control member 110 along the vertical axis. Accordingly, if a user does not exert force on the control member 110, the control member 110 may change its position depending on the applied torque. If a user exerts force on the control member 110, the user feels the applied torque.

By applying the determined set point of torque to the at least one actuator of the remote control 100, the evolution of the corresponding reference set point for the predetermined trajectory σ' over time may be presented to a user operating the remote control 100. Hence, the user can feel the evolution of the corresponding reference set point for the predetermined trajectory σ' over time. For example, an unexperienced user (i.e. a beginner) may quickly gain an intuitive understanding of the UAV 190's dynamics and learn how to control the UAV 190.

Further, the remote control 100 comprises at least one sensing circuit configured to sense the position of the at least one control member while the determined set point of torque is applied to the at least one control member by the at least one actuator in order to detect a user input for modifying the predetermined trajectory σ'. For example, the remote control may comprise sensing circuits 112 and 122 for the control members 110 and 120 such that the positions of the control members 110 and 120 are sensed while the determined set points of torque (related to the reference set points u'$_1$ to u'$_4$) are applied to the control members 110 and 120 by the actuators 111 and 121. Accordingly, the user input for modifying the predetermined trajectory σ' may be determined. That is, the movement of the torque actuated control members 110 and 120 can be overridden by the user in order to influence the trajectory executed by the UAV 190.

In some examples, the processing circuit 130 may be configured to determine the set point of torque to be applied to the at least one control member 110, 120 based on the reference set point of the control parameter and additionally the sensed position of the at least one control member 110, 120. For example, the processing circuit 130 may determine the set point of torque to be applied to the control member 110 based on the reference set point u'$_1$ of the associated control parameter u$_1$ and additionally the sensed position of the control member 110.

In addition, the remote control 100 comprises a wireless transmitter 140 (e.g. a radio frequency transmitter) coupled to an antenna 150 of the remote control 100. The wireless transmitter 140 is configured to transmit information about the sensed position of the at least one control member to the UAV 190. For example, wireless transmitter 140 may transmit information about the sensed positions of the control members 110 and 120 such that the UAV 190 may update the set points of the control parameters u$_1$ to u$_4$ in order to modify the predetermined trajectory σ'.

As indicated in FIG. 1, the UAV 190 comprises wireless receiver 192 configured to receive the information about the sensed position of the at least one control member of the remote control 100. For example, wireless receiver 192 may receive the information about the sensed positions of the control members 110 and 120.

The processing circuit 191 of the UAV 190 determines an updated set point of the respective control parameter based on the information about the sensed position of the at least one control member. For example, the processing circuit 191 may determine an updated set point of the control parameter u$_1$ based on the information about the sensed position along the vertical axis of the control member 110. Similarly, the processing circuit 191 may determine updated set points for the other control parameters u$_2$ to u$_4$ based on the information about the sensed positions of the control members 110 and 120.

The processing circuit 191 of the UAV 190 is further configured to use the updated set point of the control parameter for controlling operation of the UAV 190 in order to modify the UAV 190's autonomous flight of the predetermined trajectory σ'. For example, the processing circuit 191 may use the updated set point of the control parameter u$_1$ to u$_4$ for controlling operation of the UAV 190. By using the updated set points of the control parameters u$_1$ to u$_4$, the autonomous flight of the predetermined trajectory σ' may be modified. The UAV 190, hence, flies along a user modified trajectory instead of the predetermined trajectory σ'.

The remote control 100 may, hence, allow to influence a predetermined (preprogrammed) trajectory at any time by actively moving the at least one control member of the remote control 100. On releasing the one or more control members of the remote control 100, the reference set points u'$_1$ to u'$_4$ are not updated such that the UAV 190 returns to the originally programmed trajectory σ' which allows a precise fine-tuning over multiple repetitions. For example, the predetermined trajectory σ' may initially be pre-defined using a GUI at a computer or a mobile device, or (e.g. by default) consist of maintaining a single fixed position above the takeoff point forever. The proposed technique may, hence, provide a bridge between computer designed trajectories, which are hard to modify, and full manual control, which is hard to replicate and is not precise enough.

The remote control 100 additionally comprises a button 101 (start button) for selectively controlling the UAV 190 to start autonomous flight of the predetermined trajectory σ'. The wireless transmitter 140 is configured to transmit, to the UAV 190, a command to start autonomous flight of the predetermined trajectory σ' if the button 101 is pressed by the user. Upon reception of the command, the UAV 190 start autonomous flight of the predetermined trajectory σ'.

Further, the remote control 100 comprises another button 102 (stop button) for selectively controlling the UAV 190 to stop autonomous flight of the predetermined trajectory σ'. The wireless transmitter 140 is configured to transmit, to the UAV 190, a command to stop autonomous flight of the predetermined trajectory σ' if the button 102 is pressed by the user. Upon reception of the command, the UAV 190 stops autonomous flight of the predetermined trajectory σ'.

The remote control 100 comprises still another button 103 (reset button) for selectively updating the predetermined trajectory σ'. The wireless transmitter 140 is configured to transmit, to the UAV 190, a command to update the stored predetermined trajectory σ' to the user modified trajectory if the button 103 is pressed by the user. In the UAV 190, the predetermined trajectory σ' is stored in the memory 195. If the command to update the stored predetermined trajectory σ' is received from the remote control 100 by the wireless receiver 192, the processing circuit 191 of the UAV 190 is configured to update the stored predetermined trajectory σ' to the user modified trajectory, i.e. the trajectory derived from the predetermined trajectory σ' based on the sensed user input at the remote control 100. That is, depending on the user's choice, the changed (updated) trajectory may be stored as new reference trajectory, which may allow an incremental refinement of the predetermined trajectory σ' in an intuitive fashion.

The UAV 190 may be assumed to have dynamics which are differentially flat. Based on the values of the four adjustable control parameter $u_1$ to $u_4$, which are the input for the motion control of the UAV 190, four output parameters x, y, z and ψ describing the current pose of the UAV 190 are effectively obtained. The output parameters x, y and z describe (denote) the position of the UAV 190's center of mass and the output parameter ψ describe (denote) the yaw angle of the UAV 190.

At any point in time, the UAV 190 has a state X defined by the position of the UAV 190's center of mass, the velocity of the UAV 190's center of mass, the orientation of the UAV and the angular velocities of the UAV (around the pitch, the roll and the yaw axes).

The adjustable control parameters $u_1$ to $u_4$ may be derived from the predetermined trajectory σ' if the state X of the UAV 190 is known. The state X of the UAV 190 is observable by means of sensors such as an Inertial Measurement Unit (IMU) and a position sensor for a Global Navigation Satellite System (GNSS) such as the Global Positioning System (GPS). Due to the differential flatness of the dynamic system, the adjustable control parameters $u_1$ to $u_4$ may be derived from the predetermined trajectory σ' using the state X of the UAV 190. In general, the adjustable control parameters $u_1$ to $u_4$ may be derived at the UAV 190 or at the remote control 100.

For example, the processing circuit 191 of the UAV 190 may be configured to derive the reference set point of a control parameter of the UAV 190 using information about at least one of the position of the UAV 190's center of mass, the velocity of the UAV 190's center of mass, the orientation of the UAV and the angular velocities of the UAV (around the pitch, the roll and the yaw axes). Subsequently, the wireless transmitter 193 of the UAV 190 is configured to transmit information about the reference set point of the control parameter to the remote control 100. In some examples, the processing circuit 191 of the UAV 190 derives the reference set points $u'_1$ to $u'_4$ of the control parameters $u_1$ to $u_4$ in this manner and the wireless transmitter 193 transmits the reference set points $u'_1$ to $u'_4$ to the remote control 100.

A wireless receiver 160 of the remote control 100 is coupled to the antenna 150 and configured to receive the information about the (respective) reference set point of the control parameter(s) from the UAV 190. Accordingly, the information may be provided to the processing circuit 130 of the remote control 100 for controlling the actuators 111 and 121.

For controlling the UAV 190, the UAV 190 and the remote control 100 may, hence, be equipped with means for bi-directional communication.

During the UAV 190's autonomous flight of the predetermined trajectory σ', the (respective) reference set point(s) of the control parameter(s) of the UAV 190 is/are sent to the remote control 100 and used as set point(s) for the torque controlled actuators controlling the (e.g. four) degrees of freedom of the one or more control members of the remote control 100.

In order to provide a good user experience, the torque(s) applied to the one or more control members of the remote control may be scaled appropriately. For example, the processing circuit 130 of the remote control 100 may be configured to determine the set point of torque to be applied to the at least one control member by selecting, based on the reference set point of the control parameter associated to the control member, a torque value from a predetermined torque value range as the set point of torque to be applied to the at least one control member. For example, the processing circuit 130 may select, based on the on the reference set point $u'_1$ of the control parameter $u_1$ associated to the vertical axis of the control member 110 (and optionally the sensed position of the control member 110), a torque value from a predetermined torque value range as the set point of torque to be applied to the control member 110 along the vertical axis. Accordingly, torque within reasonable limits may be applied to the one or more control members of the remote control 100. Similarly, the set point of torque for the horizontal axis of the control member 110 and the set points of torque for the spatial axes of the control member 120 may be determined (the torque value ranges may be identical or different for different control members and/or different spatial axes).

The actual position(s) of the one or more control members of the remote control 100 is/are continuously sensed and sent back to the UAV 190 so that the control system of the UAV 190 (e.g. the processing circuit 191) can set its control outputs for the rotors 194-1, . . . , 194-4 accordingly (e.g. set points for the angular velocities of the UAV's motors). Latency in the communication between the UAV 190 and the remote control 100 may be compensated by prediction at the UAV 190 and/or the remote control 100.

The reference set point of the control parameter as used by the remote control 100 for controlling the applied torque may, e.g., be a predicted set point of the control parameter for a future point in time. For example, the reference set point $u'_1$ of the control parameter $u_1$ used for controlling the torque applied to the control member 110 along the vertical axis may be a predicted set point of the control parameter for a future point in time. The predicted set point of the control parameter may be determined by the processing circuit 130 of the remote control 100. For example, the processing circuit 130 may be configured to predict a future dynamic of the UAV 190 based on a model of the UAV 190 and the information about the reference set point of the control parameter received from the UAV 190. Further, the processing circuit 130 may be configured to determine the predicted set point of the control parameter for the future point in time based on the predicted future dynamic of the UAV 190 and the received information about the reference set point of the control parameter. For example, the processing circuit 130 may predict a future dynamic of the UAV based on a model of the UAV 190 and the information about the reference set points $u'_1$ to $u'_4$ received from the UAV 190. Based on the predicted future dynamic of the UAV 190 the received information about the reference set points $u'_1$ to $u'_4$, the processing circuit 130 may determine the respective predicted set point of the control parameters $u_1$ to $u_4$ for a future point in time.

At the UAV 190, prediction may be used for determining the (respective) updated set point of the control parameter(s). For example, for determining the updated set point of a control parameter, the processing circuit 191 of the UAV 190 may predict a future position of the at least one control member (associated to the control parameter) based on the information about the sensed position of the at least one control member and a model of the user (e.g. first order dynamics). Further, the processing circuit 191 may determine the updated set point of the control parameter based on the predicted future position of the at least one control member. For example, for determining the updated set point of the control parameter $u_1$, the processing circuit 191 may predict a future position of the control member 110 along the vertical axis based on the information about the sensed position of the control member 110 along the vertical axis and a model of the user. Subsequently, the processing circuit 191 may determine the updated set point of the control parameter $u_1$ based on the predicted future position of the control member 110.

Figure 2:
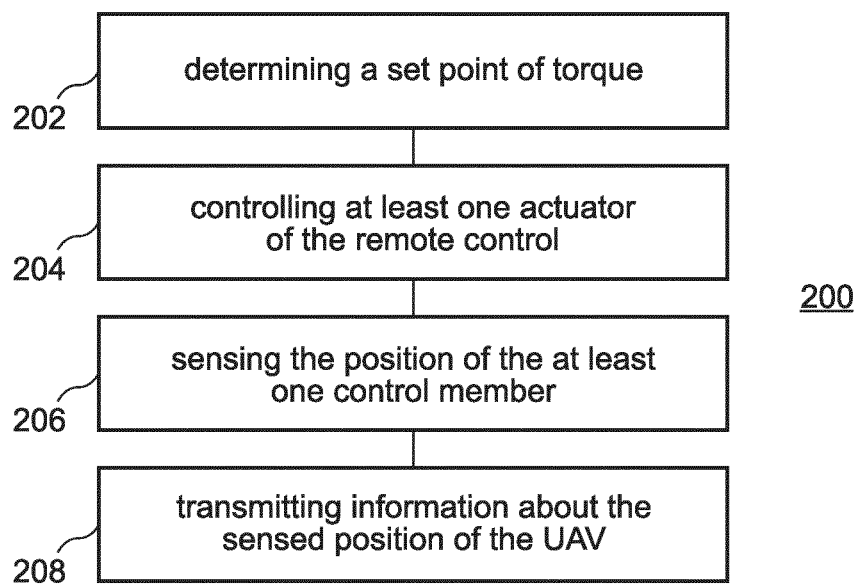
FIG. 2 illustrates a flowchart of an example of a method for modifying an UAV's autonomous flight of a predetermined trajectory.

In order to summarize the above aspects on controlling an UAV, FIG. 2 further illustrates a flowchart of a method 200 for modifying an UAV's autonomous flight of a predetermined trajectory. Method 200 comprises determining 200 a set point of torque to be applied to at least one control member of a remote control for the UAV based on a reference set point for an adjustable control parameter of the UAV. The reference set point of the control parameter is related to the predetermined trajectory, and wherein a set point of the control parameter is adjustable via the at least one moveable control member. Further, method 200 comprises controlling 204 at least one actuator of the remote control to apply the determined set point of torque to the at least one control member. Method 200 additionally comprises sensing 206 the position of the at least one control member while the determined set point of torque is applied to the at least one control member by the at least one actuator in order to detect a user input for modifying the predetermined trajectory. Method 200 comprises transmitting 208 information about the sensed position of the at least one control member to the UAV.

Similar to what is described above with respect to the system illustrated in FIG. 1, method 200 may allow improved control of an UAV.

Further, the proposed technique may be combined with Virtual Reality (VR) or Augmented Reality (AR) technology to further improve the piloting experience. Method 200 may further comprise presenting an AR or VR view to a user, wherein the AR or VR view comprises a visualization of information related to at least one of the predetermined trajectory and the user modified trajectory. For example, the predetermined trajectory and/or the user modified trajectory may be overlaid onto a (two-dimensional or three-dimensional) graphical representation of the UAV's environment. Further, additional information from UAV may be visualized (e.g. status information).

More details and aspects of the method are explained in connection with the proposed technique or one or more example embodiments described above. The method may comprise one or more additional optional features corresponding to one or more aspects of the proposed technique or one or more examples described above.

The proposed technique relates to a control interface with control members that are torque controlled and provide feedback of the current set points (which may be derived from the state of the UAV and the preprogrammed reference trajectory) to the user. By touching the control members and actively moving them, a user may override the reference trajectory at any time, which provides an intuitive way for influencing and fine-tuning the UAV trajectory. The proposed technique may allow even non-experts to teach, replay and modify UAV trajectories, achieving (very) precise results.

The following examples pertain to further embodiments:

(1) A remote control adapted to modify an UAV's autonomous flight of a predetermined trajectory. The remote control comprises at least one moveable control member for adjusting a set point of an adjustable control parameter of the UAV. Further, the remote control comprises at least one actuator capable of controllably applying a torque to the at least one control member. The remote control additionally comprises a processing circuit configured to determine a set point of torque to be applied to the at least one control member based on a reference set point of the control parameter. The reference set point of the control parameter is related to the predetermined trajectory. The processing circuit is further configured to control the at least one actuator to apply the determined set point of torque to the at least one control member. The remote control comprises a sensing circuit configured to sense the position of the at least one control member while the determined set point of torque is applied to the at least one control member by the at least one actuator in order to detect a user input for modifying the predetermined trajectory. In addition, the remote control comprises a wireless transmitter configured to transmit information about the sensed position of the at least one control member to the UAV.

(2) The remote control of (1), further comprising a wireless receiver configured to receive information about the reference set point of the control parameter from the UAV.

(3) The remote control of (1) or (2), wherein the processing circuit is configured to determine the set point of torque to be applied to the at least one control member based on the reference set point of the control parameter and the sensed position of the at least one control member.

(4) The remote control of any of (1) to (3), wherein the processing circuit is configured to determine the set point of torque to be applied to the at least one control member by selecting, based on the reference set point of the control parameter, a torque value from a predetermined torque value range as the set point of torque to be applied to the at least one control member.

(5) The remote control of any of (1) to (4), wherein the remote control comprises two control members each moveable along two spatial axes, and wherein each of the two control members is for adjusting set points of two different adjustable control parameters of the UAV.

(6) The remote control of any of (1) to (5), wherein the reference set point of the control parameter is derived from the predetermined trajectory using information about at least one of a position of the UAV's center of mass, a velocity of the UAV's center of mass, an orientation of the UAV and angular velocities of the UAV.

(7) The remote control of any of (1) to (6), wherein the reference set point of the control parameter is a predicted set point of the control parameter for a future point in time.

(8) The remote control of (7), wherein the processing circuit is further configured to: predict a future dynamic of the UAV based on a model of the UAV and information about the reference set point of the control parameter received from the UAV; and determine the predicted set point of the control parameter for the future point in time based on the predicted future dynamic of the UAV and the received information about the reference set point of the control parameter.

(9) The remote control of any of (1) to (8), further comprising a button for selectively controlling the UAV to start autonomous flight of the predetermined trajectory, wherein the wireless transmitter is configured to transmit, to the UAV, a command to start autonomous flight of the predetermined trajectory if the button is pressed by a user.

(10) The remote control of any of (1) to (9), further comprising a button for selectively controlling the UAV to stop autonomous flight of the predetermined trajectory, wherein the wireless transmitter is configured to transmit, to the UAV, a command to stop autonomous flight of the predetermined trajectory if the button is pressed by a user.

(11) The remote control of any of (1) to (10), further comprising a button for selectively updating the predetermined trajectory, wherein the wireless transmitter is configured to transmit, to the UAV, a command to update the stored predetermined trajectory to the user modified trajectory if the button is pressed by a user.

(12) The remote control of any of (1) to (11), wherein the UAV is a multirotor drone.

(13) A system comprising an UAV configured to autonomously fly a predetermined trajectory, and a remote control according to any of (1) to (12). The UAV comprises a wireless receiver configured to receive the information about the sensed position of the at least one control member. Further, the UAV comprises a processing circuit configured to determine an updated set point of the control parameter based on the information about the sensed position of the at least one control member. The processing circuit of the UAV is further configured to use the updated set point of the control parameter for controlling operation of the UAV in order to modify the UAV's autonomous flight of the predetermined trajectory.

(14) The system of (13), wherein the processing circuit of the UAV is further configured to derive the reference set point of the control parameter from the predetermined trajectory, and wherein the UAV comprises a wireless transmitter configured to transmit information about the reference set point of the control parameter to the remote control.

(15) The system of (13) or (14), wherein the processing circuit of the UAV is further configured to derive the reference set point of the control parameter using information about at least one of a position of the UAV's center of mass, a velocity of the UAV's center of mass, an orientation of the UAV and angular velocities of the UAV.

(16) The system of any of (13) to (15), wherein the processing circuit of the UAV is further configured to determine the updated set point of the control parameter by: predicting a future position of the at least one control member based on the information about the sensed position of the at least one control member and a model of the user; and determining the updated set point of the control parameter based on the predicted future position of the at least one control member.

(17) The method of any of (13) to (16), wherein the predetermined trajectory is stored in a memory of the UAV, and wherein the processing circuit of the UAV is further configured to update the stored predetermined trajectory to the user modified trajectory if a command to update the stored predetermined trajectory is received from the remote control.

(18) A method for modifying an UAV's autonomous flight of a predetermined trajectory. The method comprises determining a set point of torque to be applied to at least one control member of a remote control for the UAV based on a reference set point for an adjustable control parameter of the UAV. The reference set point of the control parameter is related to the predetermined trajectory, and wherein a set point of the control parameter is adjustable via the at least one moveable control member. Further, the method comprises controlling at least one actuator of the remote control to apply the determined set point of torque to the at least one control member. The method additionally comprises sensing the position of the at least one control member while the determined set point of torque is applied to the at least one control member by the at least one actuator in order to detect a user input for modifying the predetermined trajectory. The method comprises transmitting information about the sensed position of the at least one control member to the UAV.

(19) The method of (18), further comprising: determining, by the UAV, an updated set point of the control parameter based on the information about the sensed position of the at least one control member; and using, by the UAV, the updated set point of the control parameter for controlling operation of the UAV in order to modify the UAV's autonomous flight of the predetermined trajectory.

(20) The method of (18) or (19), further comprising presenting an augmented or a virtual reality view to a user, wherein the augmented or virtual reality view comprises a visualization of information related at least one of the predetermined trajectory and the user modified trajectory.

(21) The method of any of (18) to (20), wherein the UAV is a multirotor drone.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A remote control adapted to modify an unmanned aerial vehicle's autonomous flight of a predetermined trajectory, the remote control comprising:
   at least one moveable control member for adjusting a set point of an adjustable control parameter of the unmanned aerial vehicle;
   at least one actuator capable of controllably applying a torque to the at least one control member;
   a processing circuit configured to:
      determine a set point of torque to be applied to the at least one control member based on a reference set point of the control parameter, wherein the reference set point of the control parameter is related to the predetermined trajectory and the reference set point of the control parameter is a predicted set point of the control parameter for a future point in time; and
      control the at least one actuator to apply the determined set point of torque to the at least one control member;
   a sensing circuit configured to sense the position of the at least one control member while the determined set point of torque is applied to the at least one control member by the at least one actuator in order to detect a user input for modifying the predetermined trajectory; and
   a wireless transmitter configured to transmit information about the sensed position of the at least one control member to the unmanned aerial vehicle.

2. The remote control of claim 1, further comprising:
   a wireless receiver configured to receive information about the reference set point of the control parameter from the unmanned aerial vehicle.

3. The remote control of claim 1, wherein the processing circuit is configured to determine the set point of torque to be applied to the at least one control member based on the reference set point of the control parameter and the sensed position of the at least one control member.

4. The remote control of claim 1, wherein the processing circuit is configured to determine the set point of torque to be applied to the at least one control member by selecting, based on the reference set point of the control parameter, a torque value from a predetermined torque value range as the set point of torque to be applied to the at least one control member.

5. The remote control of claim 1, wherein the remote control comprises two control members each moveable along two spatial axes, wherein each of the two control members is for adjusting set points of two different adjustable control parameters of the unmanned aerial vehicle.

6. The remote control of claim 1, wherein the reference set point of the control parameter is derived from the predetermined trajectory using information about at least one of a position of the unmanned aerial vehicle's center of mass, a velocity of the unmanned aerial vehicle's center of mass, an orientation of the unmanned aerial vehicle and angular velocities of the unmanned aerial vehicle.

7. The remote control of claim 1, wherein the processing circuit is further configured to:
   predict a future dynamic of the unmanned aerial vehicle based on a model of the unmanned aerial vehicle and information about the reference set point of the control parameter received from the unmanned aerial vehicle; and
   determine the predicted set point of the control parameter for the future point in time based on the predicted future dynamic of the unmanned aerial vehicle and the received information about the reference set point of the control parameter.

8. The remote control of claim 1, further comprising a button for selectively controlling the unmanned aerial vehicle to start autonomous flight of the predetermined trajectory, wherein the wireless transmitter is configured to transmit, to the unmanned aerial vehicle a command to start autonomous flight of the predetermined trajectory if the button is pressed by a user.

9. The remote control of claim 1, further comprising a button for selectively controlling the unmanned aerial vehicle to stop autonomous flight of the predetermined trajectory, wherein the wireless transmitter is configured to transmit, to the unmanned aerial vehicle, a command to stop autonomous flight of the predetermined trajectory if the button is pressed by a user.

10. The remote control of claim 1, further comprising a button for selectively updating the predetermined trajectory, wherein the wireless transmitter is configured to transmit, to the unmanned aerial vehicle, a command to update the stored predetermined trajectory to the user modified trajectory if the button is pressed by a user.

11. The remote control of claim 1, wherein the unmanned aerial vehicle is a multirotor drone.

12. A system, comprising:
   an unmanned aerial vehicle configured to autonomously fly a predetermined trajectory; and
   a remote control according to claim 1,
   wherein the unmanned aerial vehicle comprises a wireless receiver configured to receive the information about the sensed position of the at least one control member, and
   wherein the unmanned aerial vehicle comprises a processing circuit configured to:
   determine an updated set point of the control parameter based on the information about the sensed position of the at least one control member; and
   use the updated set point of the control parameter for controlling operation of the unmanned aerial vehicle in order to modify the unmanned aerial vehicle's autonomous flight of the predetermined trajectory.

13. The system of claim 12, wherein the processing circuit of the unmanned aerial vehicle is further configured to derive the reference set point of the control parameter from the predetermined trajectory, and wherein the unmanned aerial vehicle comprises a wireless transmitter configured to transmit information about the reference set point of the control parameter to the remote control.

14. The system of claim 12, wherein the processing circuit of the unmanned aerial vehicle is further configured to derive the reference set point of the control parameter using information about at least one of a position of the unmanned aerial vehicle's center of mass, a velocity of the unmanned aerial vehicle's center of mass, an orientation of the unmanned aerial vehicle and angular velocities of the unmanned aerial vehicle.

15. The system of claim 12, wherein the processing circuit of the unmanned aerial vehicle is further configured to determine the updated set point of the control parameter by:
   predicting a future position of the at least one control member based on the information about the sensed position of the at least one control member and a model of the user; and
   determining the updated set point of the control parameter based on the predicted future position of the at least one control member.

16. The system of claim 12, wherein the predetermined trajectory is stored in a memory of the unmanned aerial vehicle, and wherein the processing circuit of the unmanned aerial vehicle is further configured to update the stored predetermined trajectory to the user modified trajectory if a command to update the stored predetermined trajectory is received from the remote control.

17. A method for modifying an unmanned aerial vehicle's autonomous flight of a predetermined trajectory, the method comprising:
   determining a set point of torque to be applied to at least one control member of a remote control for the unmanned aerial vehicle based on a reference set point for an adjustable control parameter of the unmanned aerial vehicle, wherein the reference set point of the control parameter is related to the predetermined trajectory and the reference set point of the control parameter is a predicted set point of the control parameter for a future point in time, and wherein a set point of the control parameter is adjustable via the at least one moveable control member;
   controlling at least one actuator of the remote control to apply the determined set point of torque to the at least one control member;
   sensing the position of the at least one control member while the determined set point of torque is applied to the at least one control member by the at least one actuator in order to detect a user input for modifying the predetermined trajectory; and
   transmitting information about the sensed position of the at least one control member to the unmanned aerial vehicle.

18. The method of claim 17, further comprising:
   determining, by the unmanned aerial vehicle, an updated set point of the control parameter based on the information about the sensed position of the at least one control member; and
   using, by the unmanned aerial vehicle, the updated set point of the control parameter for controlling operation of the unmanned aerial vehicle in order to modify the unmanned aerial vehicle's autonomous flight of the predetermined trajectory.

19. The method of claim 17, further comprising presenting an augmented or a virtual reality view to a user, wherein the augmented or virtual reality view comprises a visualization of information related at least one of the predetermined trajectory and the user modified trajectory.

* * * * *